United States Patent
Larkins et al.

(10) Patent No.: US 7,975,311 B2
(45) Date of Patent: Jul. 5, 2011

(54) MEDIA DEVICE ACCESS CONTROL MECHANISM

(75) Inventors: Neil Larkins, London (GB); Tony Pepper, London (GB); John Goodyear, Barnsley (GB)

(73) Assignee: Egress Software Technologies Ltd., London (GB)

( * ) Notice: Subject to any disclaimer, the term of this patent is extended or adjusted under 35 U.S.C. 154(b) by 10 days.

(21) Appl. No.: 12/353,390

(22) Filed: Jan. 14, 2009

(65) Prior Publication Data
US 2009/0259512 A1 Oct. 15, 2009

(30) Foreign Application Priority Data
Apr. 9, 2008 (GB) .................................. 0806429.7

(51) Int. Cl.
*G06F 17/30* (2006.01)
(52) U.S. Cl. ............ 726/29; 726/12; 700/225; 700/226; 700/227
(58) Field of Classification Search .................... 726/27, 726/29; 700/225, 226, 227
See application file for complete search history.

(56) References Cited

U.S. PATENT DOCUMENTS

| 6,185,684 | B1 | 2/2001 | Pravetz et al. |
| 6,952,697 | B1* | 10/2005 | Rothschild ............................. 1/1 |
| 2005/0066009 | A1 | 3/2005 | Keohane et al. |
| 2005/0114896 | A1* | 5/2005 | Hug et al. ....................... 725/88 |
| 2006/0218643 | A1* | 9/2006 | DeYoung ........................ 726/26 |

FOREIGN PATENT DOCUMENTS

| EP | 1085444 | 3/2001 |
| EP | 1170910 | 1/2002 |
| WO | WO 2007/078502 | 7/2007 |

OTHER PUBLICATIONS

United Kingdom Search Report dated Jul. 22, 2008 for UK Application No. GB0806429.7.

* cited by examiner

*Primary Examiner* — Jason K Gee
(74) *Attorney, Agent, or Firm* — Barnes & Thornburg LLP

(57) ABSTRACT

Invention embodiments are concerned with the problem of controlling access to a media storage device in response to, e.g., employees leaving or changing jobs. More specifically, embodiments provide a method of controlling access to a media storage device storing a plurality of media objects. Thus embodiments of the invention solve the afore-mentioned problem by providing a mechanism for updating the list of recipients based on data received from a user identification system after the media storage device has been dispatched.

28 Claims, 6 Drawing Sheets

MEDIA DEVICE ACCESS CONTROL MECHANISM

CROSS-REFERENCE TO RELATED APPLICATIONS

This application claims the benefit of priority to United Kingdom Patent Application No. GB0806429.7 filed Apr. 9, 2008, which is incorporated herein by reference in its entirety.

FIELD OF THE INVENTION

The present invention relates to a method and system for controlling access to media devices and is particularly, but not exclusively, suitable for controlling access to media storage devices such as an optical discs, laptops, PDAs, mobile phones, and other such devices, for which assembly of data on and/or parts of a device is specified by one party for receipt by another party.

BACKGROUND OF THE INVENTION

Businesses are becoming increasingly focussed in deriving value from information, that is to say, meaning that has been extracted from data. At the same time businesses are increasingly becoming distributed, geographically, which means that there is a need to transfer data and/or information between different companies (or between operating units of a given company), and thus between sites that are physically distinct from the source of the data.

Transfer of data can occur via several different channels, such as electronically (e.g. via the file transfer protocols, via email or other messaging mechanism), or by copying data onto a storage media and transporting the storage media to the site associated with the recipient. Whilst these channels provide a convenient way of transferring information between parties, they also introduce problems, mainly relating to security and data loss. For example, in the case of transportation of the storage media, there are issues associated with the reliability of the transportation service, both in terms of delivery (will the media reach the recipient?), security (will the media have been tampered with prior to reaching the recipient?), and related thereto, data loss (will the content of the media have been modified or deleted?).

Several workers have developed tools in an attempt to address the problem of security in the context of data protection: typically these tools protect data from outsiders who try to gain unauthorized access to sensitive data and also safeguard against intentional and accidental data leaks of data from a corporation. In addition, workers in the field of digital rights, or copy protection, have developed many methods for validating access to media to ensure that the media being accessed is an authorized version rather than an unauthorized copy. These methods include associating media items or media storage devices with unique identifiers and storing the identifiers centrally and applying a concept of first to access a media item; typically the methods are implemented within a client-server arrangement which validates requests on the basis of the identity of the media item/storage device and requesting user identity. U.S. Pat. No. 6,952,697 describes such a system.

Whilst these methods address authentication of data, none of them provides a solution that addresses the issues of data leakage during transportation of data from sender to destination.

SUMMARY OF THE INVENTION

In accordance with an aspect of the present invention, there is provided a method and system according to the appended claims. More specifically, there is provided a method of controlling access to a media storage device, the media storage device storing a plurality of media objects, the method comprising:

receiving first data identifying the media storage device and second data identifying a list comprising at least one authorized recipient of the media storage device;

storing the first data in association with the second data;

issuing the media storage device to at least one recipient on the list;

using a delivery session identifier to establish a delivery session for the issued media storage device with a user identification system corresponding to recipients associated with the second data;

thereafter:

updating the second data on the basis of data received from the user identification system and the delivery session identifier, thereby to modify the list of authorized recipients of the issued media storage device.

Accordingly, with embodiments of the invention, the list of recipients can updated on the basis of data received from a user identification system after the media storage device has been dispatched. This method conveniently provides a means for controlling access to the media storage device by means of changing the authorized recipients in response to, e.g. employees leaving or changing jobs, in which case their access to the storage device should be disallowed. More specifically, a media storage device has been delivered, access to the device is provided on the basis of the updated recipient list: recipients request authentication for access to the data on the media storage device, and only if the recipient is one listed in the second data (updated or original) will access to the media items be allowed.

Embodiments are particularly well suited to arrangements in which the media storage device is physically transported between different geographical locations, since changes to recipients are more likely to occur within the timescales associated with transportation. However, embodiments are also well suited to arrangements in which a given media storage device becomes misplaced or lost, in an office, in which case it may be desirable to block access to the data on the device. The method provides a particularly convenient mechanism for safeguarding against loss of a media storage device, e.g. those for which the delivery mechanism is regular mail, and in the cases in which the device goes missing.

The user identification system can be coupled with a corporation associated with recipients of the issued media storage device; accordingly in the event that internal changes within the corporation necessitate changes to recipients of the issued device, the user identification system can transmit the necessary instructions so as to trigger a change to the second data, and thus recipients that can access a given issued media storage device.

In one arrangement the instructions comprise cancellation instructions for cancelling the delivery session identifier for the issued media storage device; when the instructions are received, the second data are modified so as to prohibit access to the issued media storage device. In another arrangement, the instructions comprise one or more temporal values for use in controlling temporal access to the issued media storage device. The temporal values can be associated with one or more said recipients, and the second data are updated so as to allow access to the issued media device by the affected recipients for a specified period. In yet a further arrangement, the instructions comprise instructions to modify at least one recipient by way of addition or replacement to a recipient previously listed in the second data.

The delivery session identifier can be embodied as a link between data structures managed by the user identification system and the second data, for example as a combination of a unique identifier corresponding to the issued media storage device and recipients of the issued device, so that any updates to recipients of an issued media storage device can be made to the set of second data corresponding to a specific issued media storage device.

According to a further aspect of the present invention there is provided a distributed access control system for controlling access to a media storage device. The system preferably comprises distributed server and database components, which interoperate so as to provide the afore-mentioned functionality. In addition there is provided software for execution on the distributed components, which, when run, provide the afore-mentioned functionality. Further features and advantages of the invention will become apparent from the following description of preferred embodiments of the invention, given by way of example only, which is made with reference to the accompanying drawings.

Figure 1:
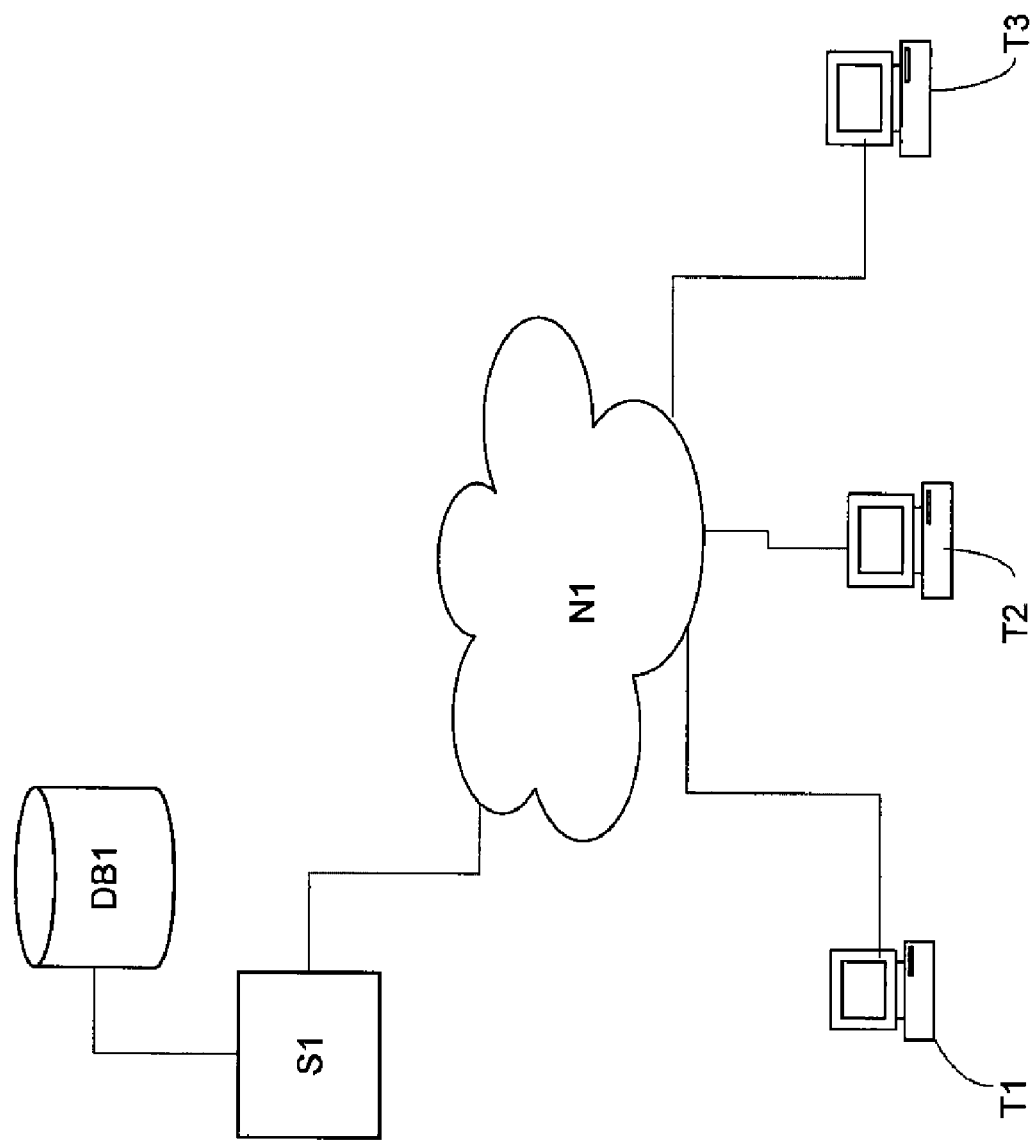
FIG. 1 is a schematic diagram showing an overview of an environment in which embodiments of the invention operate.

In the accompanying Figures various parts are shown in more than one Figure; for clarity the reference numeral initially assigned to a part is used to refer to the part in the first and subsequent Figures.

DETAILED DESCRIPTION OF THE INVENTION

As described above, embodiments of the invention are concerned with a method and system for controlling access to a media storage device which has been custom built to store a plurality of multimedia objects. A detailed description of the infrastructure, components and methods required to effect the access control will be described in detail below, but first an overview of an environment in which embodiments of the invention can operate will be described with reference to FIGS. 1 and 2.

FIG. 1 shows a server S1 operatively connected to a database system DB1, this being arranged to hold data indicative of a set of objects that has been written to a given media storage device such as an optical disc. In addition, various audit reports that relate to the set of objects can be held in the database system DB1, specifically file system database 303, together with the identities of intended recipients of the media and individuals authorized to create the media storage device. Typically the optical disc is created under control of a client terminal T1 (three exemplary terminals are shown in the Figure); the terminal T1 is accordingly equipped with bespoke software arranged to enable a user to select and specify objects to be stored on the media, to control writing of the specified objects to the media and to enable the user to specify recipients of the media. Further details of the client software are provided below, with reference to FIG. 5.

Figure 2:
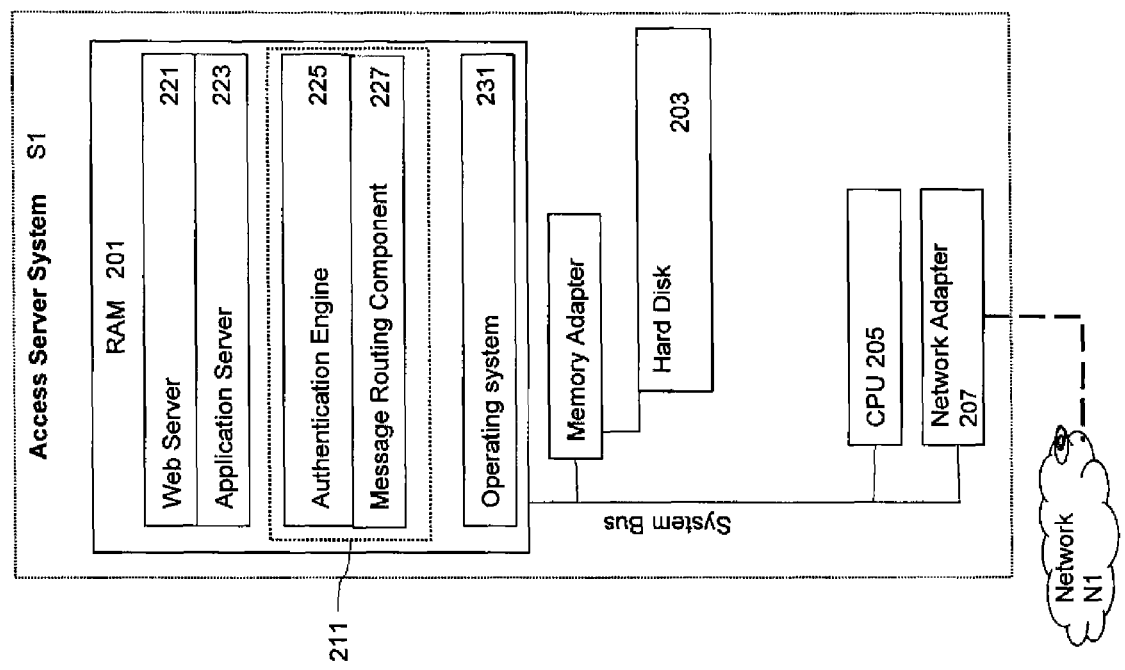
FIG. 2 is a schematic diagram showing an arrangement of the server system of FIG. 1.

Turning to FIG. 2, the server S1 can conveniently be embodied as a web server, and accordingly comprises standard web server and application server 221, 223 components, together with conventional operating system and storage components (system bus connecting the central processing unit (CPU) 205, hard disk 203, random access memory (RAM) 201, I/O and network adaptors 207 facilitating connection to user input/output devices interconnection with other devices on the network N1). The Random Access Memory (RAM) 201 contains operating system software 231 which control, in a known manner, low-level operation of the server S1. The server RAM 201 also contains the application server software 223 and the web server software 221, and an access software component 211, which comprises an authentication engine 225 and a message routing component 227. The access software component 211 facilitates communication between any given client T1, T2, T3 and the various parts of the database system DB1. In one arrangement the client T1 and server S1 communicate via Simple Object Access Protocol (SOAP) formatted messages, and these are processed and security checked by the access software component 211, then dispatched to the appropriate sub system of the database system DB1 for further auctioning, as will be described in more detail below. This security checking on the part of the access component 211 can conveniently be provided by the authentication engine 225 shown in FIG. 2.

Figure 3:
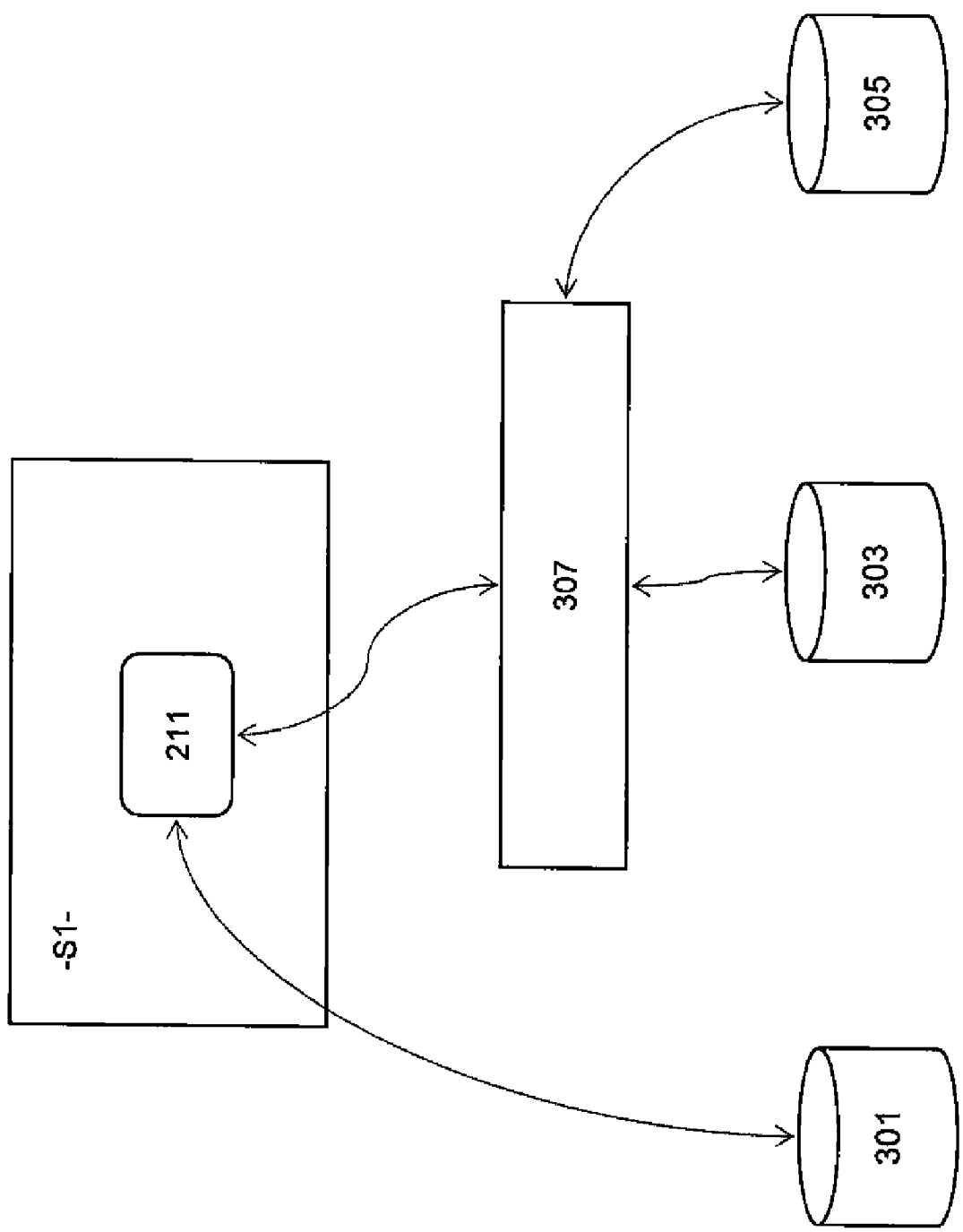
FIG. 3 is a schematic diagram showing an arrangement of the database system of FIG. 1 in conjunction with the server system shown in FIG. 2.

Referring to FIG. 3, the database DB1 comprises a creator database 301, which holds data relating to all client terminals T1, T2, T3 and/or users thereof, which are entitled to create media using a system according to embodiments of the invention. Accordingly, in response to communications received from any given terminal T1, T2, T3, the authentication engine 225 is arranged to communicate with the creator database 301 in order to verify, or otherwise, the identity of the client terminal and/or user/creator from which communications are received. In one arrangement, once the identity has been authenticated, the user/creator is assigned a ticket which is valid for the duration of the session between the terminal T1 and the server S1 and accompanies each successive communication associated with the session. This conveniently avoids the need for the access component 211 to authenticate the user/creator at every interaction (which is costly in CPU terms), and instead requires the component 211 to simply verify the ticket.

The message routing component 227 is arranged to route communications received from the terminal T1 on the basis of the content of the communication and prestored rules which map type of request to a sub system of the database system DB1. In one arrangement the sub systems cooperate with various software components, collectively labelled as part 307 in the Figure, so as to process the data in the request and store data in, or retrieve from, a particular store of the database system DB1. For example, and as will be described in more detail below, the user/creator can specify a set of objects to be written to an optical disc connected locally to the terminal T1; this step can be accompanied by the sending of data to the server S1 so as to maintain a log of events associated with the objects, their subsequent assignment to a tangible media storage device and recipients authorized to access the media storage device.

Considering firstly the step of specifying a set of objects to be written to a media storage device, the identities of the objects are stored as a structure and the structure is transmitted to the server S1 in a data message. Upon receipt by the server S1, the message routing component 227 is arranged to determine the content of the message and route the message accordingly: in this case the message is routed to a sub database 305 and the structure is stored in association with the session ticket and the user/creator identity (these having been identified by a software component residing in part 307). Assuming the step of writing the objects to a media storage device to occur during a different session, the message routing component 227 is arranged to retrieve data indicative of the previously defined structure from the sub database 305 for display to the user/creator at the terminal T1 and enable the user/creator to modify, by way of addition or deletion, to the set of objects prior to the burning of the objects to a media storage device. Once the objects have been written to, e.g. an optical disc, an audit log is created at the terminal T1 and this audit log, together with the updated or otherwise data structure, are transmitted to the server. The message routing component 227 is arranged to route the data structure content of the message to the sub database 305 for storage of the content therein, again in association with the session ticket and the user/creator identity, while the content of the audit log is transmitted to the sub database 303. The audit log record in sub database 303 is linked to the entry in sub database 305 via an audit log ID to as to enable the corresponding audit logs to be retrieved for any given session ID.

According to an embodiment of the invention, in relation to recipients of a media storage device to which the selected objects have been written, the recipients can be specified (and/or amended) before and/or at the time of creation of the media storage device, and/or after creation of the media storage device, and/or after dispatch of the media storage device to a specified recipient. Considering firstly the cases in which recipients are specified and/or amended prior to dispatch of a media storage device, the user/creator can retrieve, from one of the database sub systems associated with the database system DB1, a list of identities of recipients in respect of whom the user/creator is entitled to send media storage devices, and select from the list.

The content of this list is dependent on two factors: a first being the identity of the user creating the media storage device, and a second being the policy specified by the corporation who has requested creation of media storage devices. In relation to the first factor, any given user/creator may only be entitled to create media storage devices for individuals holding certain positions within certain corporations requesting the device. This may be specified via media creation rights, which, as is known in the art, may be configured according to a hierarchical structure defining access rights in accordance with a given creating user/creator's position within the hierarchy; these data are stored in the user/creator database 301. As regards the corporation associated with the recipients, namely the entity that has requested creation of media storage devices, the structure of a given corporation Z can be used to define access to media objects. In other words, depending on the position of individuals within the company, some individuals could be authorized recipients of a media storage device whereas others could not. In any event, what the user/creator of terminal T1 sees is a list of potential recipients, these being a list of individuals from the corporation, filtered according to the recipient's position within the company and the user/creator's rights to create media storage devices for individuals within the company Z. A particular advantage of this mechanism is that as changes occur to the company's structure (and indeed individual appointments therein), the list of potential recipients changes, since these data are updated in the database system DB1. Accordingly this provides a mechanism for defining recipients on the basis of the most up to date information available. Once the recipients have been selected, messages comprising data identifying a given media storage device and a recipient corresponding thereto is transmitted to the server S1, and the respective media storage device identities are stored in the database DB1 in association with the recipient identities.

Figure 4:
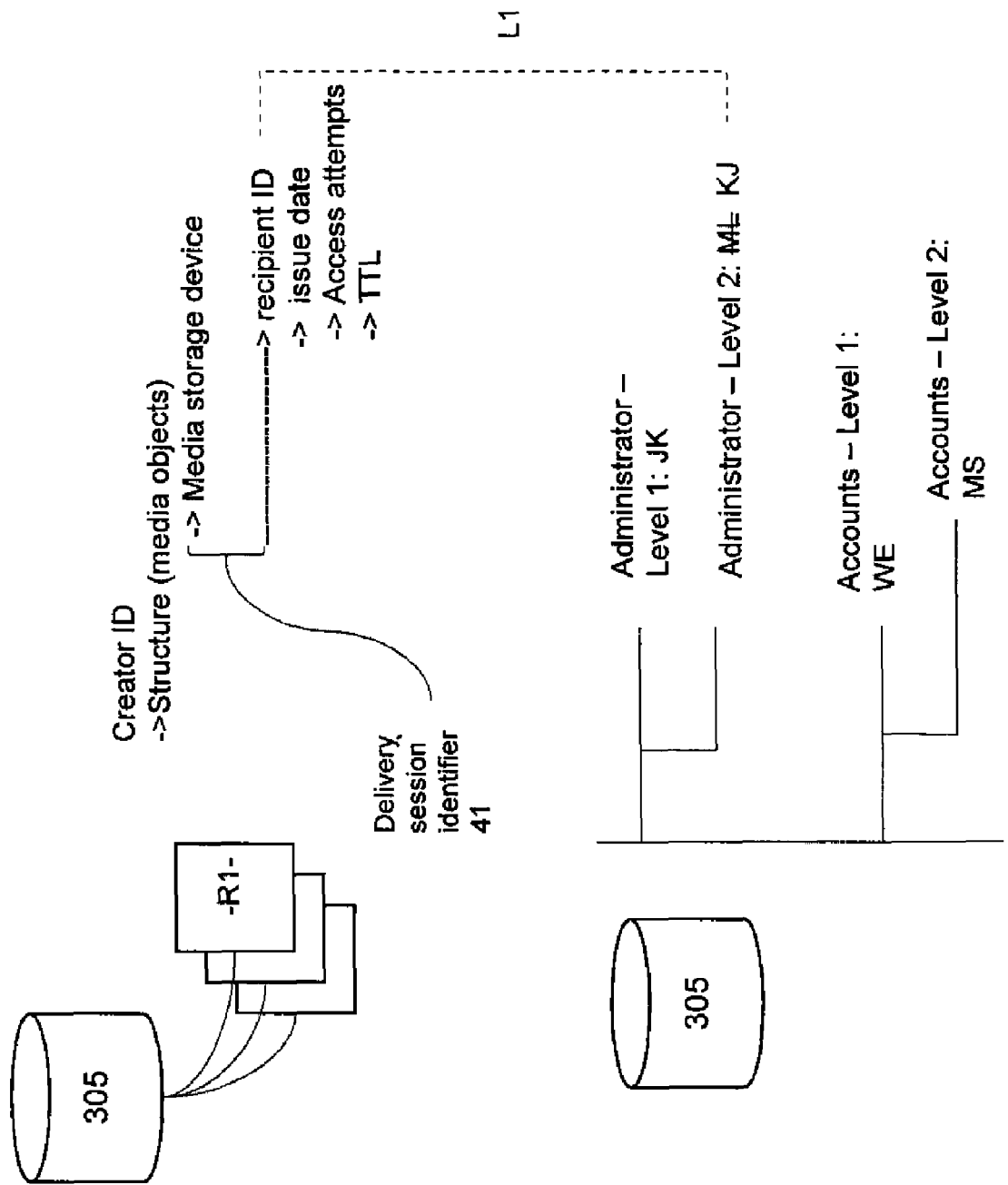
FIG. 4 is a schematic diagram showing an exemplary record in the database system of FIG. 3 according to an embodiment of the invention.

FIG. 4 shows an exemplary record R1 in the sub database 305 according to an embodiment of the invention, the record R1 having been populated after a media storage device has been created for a given recipient: as can be seen, the identity of the user/creator is stored, together with the structure defining the media objects selected by the user/creator and the identity of the media storage device containing these selected objects. The recipient identity is also appended to the record R1, this preferably being linked by means of a link L1 to an entry of recipients stored in the sub database 305 via their position within the corporation Z with which the recipient is associated. As can be seen from the Figure, whenever an individual associated with a given function changes, the entry in Record R1 will automatically change. This ensures that only currently authorized individuals can access data stored on the media storage device. The record R1 additionally keeps a record of the access attempts in respect of a given media storage device, so as to track the access history for a given media storage device. In addition to identifying the individual media items burnt to the media storage device and an audit log relating to the burning operation, the record R1 stores a date on which the media storage device was issued and a time to live (TTL) parameter, which can be specified by the user/creator and serves to specify a period of time for which the media objects stored on the media storage device are considered to be valid. If the recipient attempts to read the media storage device after the TTL period has expired, these attempts will be rejected owing to the fact that the creator considers its content to be out of date. Whilst FIG. 4 shows one set of data for one structure of media objects, it will be appreciated that there may be many such sets of data for a given set of objects (one per storage device and recipient).

Considering next the case in which recipients are amended after dispatch of the media storage devices, it will be appreciated from the foregoing that company structures can change, as indeed can the individuals employed by a given company. These changes will be escalated to the database system DB1, preferably sub database 305, under control of the company, or more specifically a user identification system corresponding to the company, and via the server S1. These changes are used to update the access rights to dispatched media storage devices via a delivery session identifier 41 that uniquely relates an issued media storage device to (a) recipient(s); that is to say, in the event that an individual has a particular position in corporation Z at the time of media creation that entitles the employee to receive a media storage device, and that individual subsequently changes position, this update to the company structure will be mirrored in the database 305. For example, and referring to FIG. 4, in the event that at the time of writing to the media storage device, recipient ML is employed at administrator level 2 and is selected by the user/creator as a recipient of the media storage device, this recipient will be linked to the record R1. If, subsequently, ML is replaced by employee KJ as administrator Level 2, ML will be unable to access the data on the media storage device when the device is delivered to her. Consequently, when the media storage device is delivered to employee ML, any attempts by ML to access the device will be refused.

In one arrangement, namely circumstances in which the already-dispatched media storage device can be re-routed to employee KJ, this already-dispatched device can instead be accessed by KJ. In an alternative arrangement, one that is specifically directed towards situations in which already issued media goes missing (and thus cannot be delivered to the newly identified recipient, KJ), the record R1 in the database 305 is marked as having no valid recipients; as a result the already dispatched media storage device is simply unreadable. In this arrangement, a new record is created in the database system for employee KJ, while a new device, with a commensurate new identifier, is burnt for delivery to employee KJ and the new record is updated accordingly. As can be seen from FIG. 4, each record maintains a log of attempted access attempts. This provides a means of tracking attempts by unauthorized recipients and/or failed authorization attempts on the part of an authorized recipient, whether that be access attempts after expiry of the TTL period or incorrectly entered recipient identifier and password details.

It will therefore be appreciated that there is no information stored on the media storage device that links the media storage device to a recipient: the links are instead held in the database DB1 and can be modified in accordance with changes to the individuals and media objects, as these are updated in the database. This therefore provides a particularly convenient mechanism for dynamically controlling access rights to media storage devices and indeed objects stored thereon, even after the media storage device has been dispatched for delivery.

Figure 5:
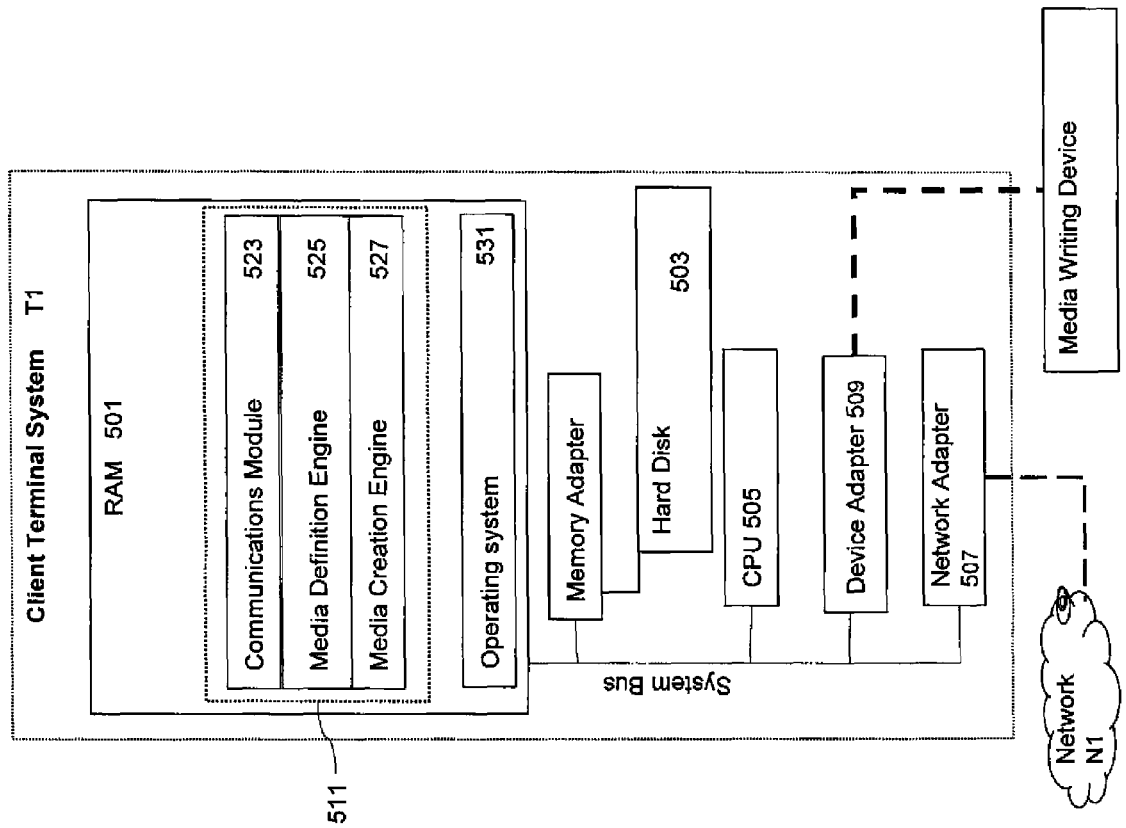
FIG. 5 is a schematic diagram showing an arrangement of a terminal system of FIG. 1.

FIG. 5 shows components of an exemplary terminal T1, configured to enable a user/creator to select media objects to be written to a particular media storage device and to select recipients of the media storage device. The terminal T1 comprises standard operating system and storage components (system bus connecting the central processing unit (CPU) 505, hard disk 503, random access memory (RAM) 201, I/O and network adaptors 507 facilitating connection to user input/output devices interconnection with other devices on the network N1). The Random Access Memory (RAM) 501 contains operating system software 531 which control, in a known manner, low-level operation of the terminal T1. The terminal RAM 501 also contains a media creating component 511, which comprises a communications module 523 for controlling communications with the server S1, a media definition engine 525, for enabling the user/creator to select media objects, and a media creation engine 527, which cooperates with the media writing device 541 so as to create a media storage device according to the selected media objects.

The media creating component 511 can be embodied as a self-contained executable software component, which can be retrieved from the server S1 or from a tangible media, and run on the terminal T1 under control of the operating system 531 in a conventional manner. The communications module 523 is configured to pass authentication data to the server so as to enable the user/creator to access from, and request the storage of data within, the database DB1 in the manner described above. The media definition engine 525 is arranged to enable the user/creator to select individual media objects and to create a structure identifying these objects, this structure being stored in the database DB1 as described above. In many cases the media objects may be selected from disparate sources, such as a USB storage device, a private network (i.e. a network that is not accessible to the database DB1), and a disc 503 local to the terminal T1, which is likewise not accessible to the database system DB1. The audit data transmitted from the terminal T1 to the server S1 at the point of creation of the media storage device accordingly include a disc map, which would allow an administrator to make sense of the audit information stored in the database system DB1.

It will be appreciated from the foregoing that the step of specifying media objects occurs prior to, and can be decoupled from, the steps of specifying recipients and creating a media storage device. This enables the user/creator to change the selection of objects—for example according to changing requirements from corporation Z—without the need to re-write data onto the media storage device. Thus the user/creator can retrieve a previously specified structure of media objects from the server S1 and amend the specification of objects, resulting in definition of an amended structure, which is subsequently transmitted to the server S1 for storage in the database system DB1; this process can be repeated as many times as is necessary prior to finalizing the set of objects and creation of the media storage device. Similarly, the recipients for any given media storage device can be modified by the user/creator independently of the media creation and specification of objects. It is to be understood that these changes to the recipients can be made independently from changes that are made to the company structure of corporation Z, which automatically take effect by virtue of the link L1 shown in FIG. 4.

Figure 6:
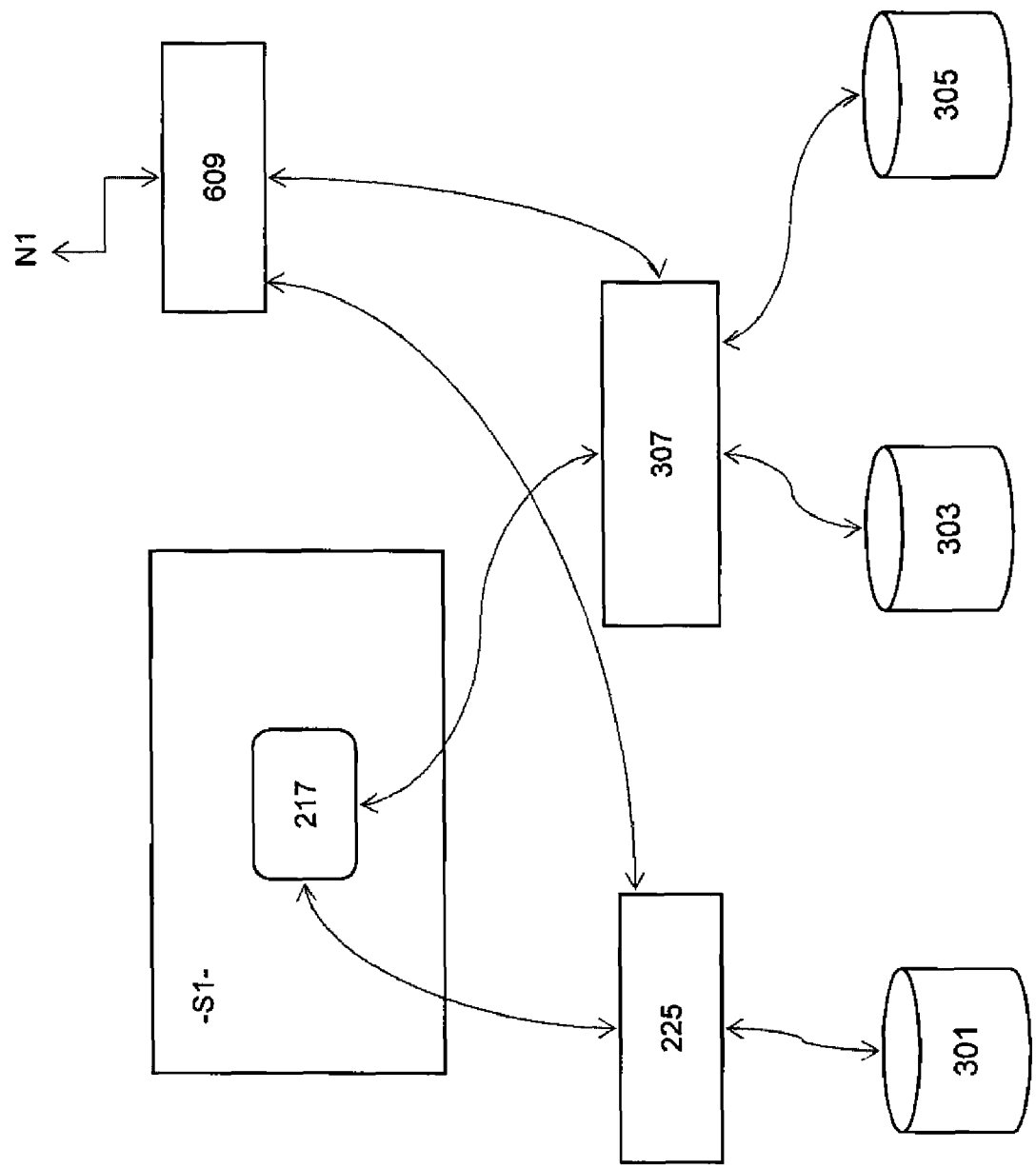
FIG. 6 is a schematic diagram showing an alternative arrangement of the server system of FIG. 2.

Turning now to FIG. 6, a second configuration of the server S1 and database DB1 will now be described: in this configuration the authentication engine 225 is provided by a standalone authentication service, which communicates with the server S1 via the message routing component 227 and various components of the database system DB1 in the manner described above. In addition, the second configuration includes a further server 601, which is embodied as a web server and comprises a web application enabling user/creators and corporations (i.e. associated with recipients) to create, update, and delete user/creators, media and access policies. This has the advantage of enabling these types of entries in the database DB1 to be managed from any browser-enabled terminal.

Additional Details and Modifications

The user/creator data stored in sub database system 301 can be stored in the Active Directory Application mode (ADAM), which is available via the Windows™ 2003 R2 Web Edition. Each organization running the client software—i.e. each set of users/creators—can be assigned a container, which has a unique string identifier associated therewith, and in relation to which all users/creators associated with the organization will reside. The audit information can be stored in sub database 303 embodied as a file system database arranged to enable searches to be performed in a reasonable amount of time; the file system 303 can be indexed by Lucene.NET™ and have a searchable interface. The media creation data can be stored in sub database 305, embodied as a Microsoft™ SQL database. As described above, this sub database 305 can also be configured to store the recipient data, in response to internal employee information received from corporations The skilled person will appreciate that mechanisms for defining recipients other than on the basis of company structure are possible: indeed the mechanism for defining recipients can be implemented via a process that accommodates updates and information received from a variety of organizations. Once recipients are identified to the server system S1, management of them and their respective rights to receive a media storage device will be specified, as will the rights of users/creators creating the media storage device. In circumstances involving a first organization, Org A, in the production of content for distribution to a second organization, Org B, there will be business processes in place to deal with the relationship between the organizations: typically a security administration function that is responsible for the users/creators of Org A, and what they can send out and to whom, will be needed to configure the appropriate access rules. These rules would then be accessible to the authentication engine 225 and most conveniently stored in the sub database 305.

For example, recipients could be specified and input to the server system S1 according to the following exemplary, non-exhaustive mechanisms:

Mass import of recipients from a CSV file or some other data interchange format.

Defined by users via one of the terminals T1, T2, T3 as "request for communication channel for data exchange".

Whilst the above embodiments relate to the writing of media objects to a media storage device such as an optical disc, they could be extended to devices such as laptops, PDAs, mobile phones, and other such devices, for which assembly of data on and/or parts of a device is specified by one party for receipt by another party. Indeed embodiments of the invention could be applied to data that are distributed via an electronic medium, such as via email or file transfer, rather than being dispatched by means of a physical carrier. In addition embodiments of the invention could apply to an individual media object, or a collection of media objects rather than to a device holding the object(s).

In addition, whilst in the above embodiments access is described in relation to a given media storage device, access can be enabled or disabled in relation to individual media objects written to the storage device on the basis of identities of respective media objects, as defined in the object structure stored in sub database 305.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of controlling access to a media storage device, the media storage device storing a plurality of media objects, the method comprising:
   receiving first data identifying the media storage device and second data identifying a list comprising at least one authorised recipient of the media storage device;
   storing the first data in association with the second data;
   issuing the media storage device to at least one recipient on the list;
   using a delivery session identifier to establish a delivery session for the issued media storage device with a user identification system corresponding to recipients associated with the second data;
   thereafter:
   updating the second data on the basis of data received from the user identification system and the delivery session identifier, thereby to modify the list of authorised recipients of the issued media storage device,
   wherein the delivery session identifier uniquely relates the issued media storage device and the media objects thereon to a given authorised recipient, and
   wherein the delivery session identifier is based on a combination of the first adapt and the second data.

2. A method according to claim 1, further comprising receiving cancellation instructions to cancel the delivery session identifier for the issued media storage device, and updating the second data in accordance with said cancellation instructions so as to prohibit access to the issued media storage device.

3. A method according to claim 2, in which the cancellation instructions identify one or more recipients listed in the second data.

4. A method according to claim 2, in which the cancellation instructions identify temporal parameters for use in controlling access to the issued media storage device.

5. A method according to claim 1, further comprising receiving modification instructions to modify at least one recipient associated with the delivery session identifier, and updating the second data in accordance with said modification instructions so as to modify access to the issued media storage device.

6. A method according to claim 5, in which the modification instructions identify a recipient other than said at least one recipient listed in the second data, and the method comprises updating the second data to include the other recipient.

7. A method according to claim 2, in which the first data identifies individual sets of multimedia objects stored on the media storage device, and the second data identifies recipients of individual said sets of said multimedia objects, in which the recipient of a first set of multimedia objects differs from a second, different, set of multimedia objects.

8. A method according to claim 5, in which the first data identifies individual sets of multimedia objects stored on the media storage device, and the second data identifies recipients of individual said sets of said multimedia objects, in which the recipient of a first set of multimedia objects differs from a second, different, set of multimedia objects.

9. A method according to claim 2, including storing said second data in a template, the template comprising a hierarchy identifying functional responsibilities associated with a corporation to which the media storage device is issued, each said functional responsibility having one or more predefined access rights to the media storage device, said list thereby defining access rights for recipients of the media storage device.

10. A method according to claim 2, further comprising receiving a request to access the issued multimedia storage device and validating said request on the basis of the second data.

11. A method according to claim 8, further comprising receiving a request to access the issued multimedia storage device and validating said request on the basis of the second data.

12. A distributed access control system for controlling access to a media storage device, the media storage device storing a plurality of media objects, the distributed access control system comprising:
   an interface arranged to receive first data identifying the media storage device and second data identifying a list comprising at least one authorised recipient of the media storage device;
   a storage system arranged to store the first data in association with the second data;
   a device issuing system arranged to issue a media storage device to at least one recipient on the list,
   wherein the device issuing system is arranged to create a delivery session identifier to establish a delivery session for the issued media storage device with a user identification system corresponding to at least one recipient associated with the second data, and
   the storage system is arranged to update the second data on the basis of the delivery session and data received from the user identification system, thereby to modify the list of authorised recipients of the issued media storage device, and wherein the delivery session identifier uniquely relates the issued media storage device and the media objects thereon to a given authorised recipient, and wherein the delivery session identifier is based on a combination of the first adapt and the second data.

13. A distributed access control system according to claim 12, wherein the interface is arranged to receive cancellation instructions from the user identification system to cancel the delivery session identifier for the issued media storage device in respect of at least one recipient listed in the second data, and the storage system is arranged to update the second data in accordance with said cancellation instructions so as to prohibit at least one access attempt to the issued media storage device.

14. A distributed access control system according to claim 13, wherein the storage system is arranged to store temporal parameter data for use in controlling access to the issued media storage device, and the cancellation instructions include a value for said temporal parameter data in relation to at least one recipient listed in the second data, the storage system being arranged to update the temporal parameter data in accordance with said value so as to prohibit at least one access attempt to the issued media storage device.

15. A distributed access control system according to claim 12, wherein the interface is arranged to receive modification instructions from the user identification system to modify at least one recipient associated with the delivery session identifier, and the storage system is arranged to update the second data in accordance with said modification instructions so as to modify access to the issued media storage device.

16. A distributed access control system according to claim 15, in which the modification instructions identify a recipient other than said at least one recipient listed in the second data, and the storage system is arranged to update the second data to include the other recipient.

17. A non-transitory computer readable medium comprising computer executable instructions for carrying out a method for controlling access to a media storage device, the media storage device storing a plurality of media objects, the method comprising:

receiving first data identifying the media storage device and second data identifying a list comprising at least one authorised recipient of the media storage device;

storing the first data in association with the second data;

issuing the media storage device to at least one recipient on the list;

using a delivery session identifier to establish a delivery session for the issued media storage device with a user identification system corresponding to recipients associated with the second data; and thereafter:

updating the second data on the basis of data received from the user identification system and the delivery session identifier, thereby to modify the list of authorised recipients of the issued media storage device, wherein the delivery session identifier uniquely relates the issued media storage device and the media objects thereon to a given authorised recipient, and wherein the delivery session identifier is based on a combination of the first adapt and the second data.

18. A non-transitory computer readable medium according to claim 17, in which the method further comprises receiving cancellation instructions to cancel the delivery session identifier for the issued media storage device, and updating the second data in accordance with said cancellation instructions so as to prohibit access to the issued media storage device.

19. A non-transitory computer readable medium according to claim 18, in which the cancellation instructions identify one or more recipients listed in the second data.

20. A non-transitory computer readable medium according to claim 18, in which the cancellation instructions identify temporal parameters for use in controlling access to the issued media storage device.

21. A non-transitory computer readable medium according to claim 17, the method further comprising receiving modification instructions to modify at least one recipient associated with the delivery session identifier, and updating the second data in accordance with said modification instructions so as to modify access to the issued media storage device.

22. A non-transitory computer readable medium according to claim 21, in which the modification instructions identify a recipient other than said at least one recipient listed in the second data, and the method comprises updating the second data to include the other recipient.

23. A non-transitory computer readable medium according to claim 18, in which the first data identifies individual sets of multimedia objects stored on the media storage device, and the second data identifies recipients of individual said sets of said multimedia objects, in which the recipient of a first set of multimedia objects differs from a second, different, set of multimedia objects.

24. A non-transitory computer readable medium according to claim 21, in which the first data identifies individual sets of multimedia objects stored on the media storage device, and the second data identifies recipients of individual said sets of said multimedia objects, in which the recipient of a first set of multimedia objects differs from a second, different, set of multimedia objects.

25. A non-transitory computer readable medium according to claim 18, the method including storing said second data in a template, the template comprising a hierarchy identifying functional responsibilities associated with a corporation to which the media storage device is issued, each said functional responsibility having one or more predefined access rights to the media storage device, said list thereby defining access rights for recipients of the media storage device.

26. A non-transitory computer readable medium according to claim 18, the method further comprising receiving a request to access the issued multimedia storage device and validating said request on the basis of the second data.

27. A non-transitory computer readable medium according to claim 24, the method further comprising receiving a request to access the issued multimedia storage device and validating said request on the basis of the second data.

28. An access control database for controlling access to a media storage device, the media storage device holding a plurality of media objects, the access control database system comprising an interface arranged to receive first data identifying the media storage device and to receive second data identifying a list comprising at least one authorised recipient of the media storage device, wherein the access control database is arranged to store the received first data in association with the received second data, wherein the access control database is operable to issue data indicative of at least one recipient from the stored second data to a device issuing system arranged to issue a media storage device, and wherein the access control database is further arranged to: store a delivery session identifier indicative of a delivery session established for the issued media storage device with a user identification system corresponding to recipients associated with the stored second data; and
update the second data on the basis of data received from the user identification system and the stored delivery session identifier, thereby to modify the stored list of authorised recipients of the issued media storage device, and wherein the delivery session identifier uniquely relates the media storage device and the media objects thereon to a given authorised recipient, and wherein the delivery session identifier is based on a combination of the first adapt and the second data.

* * * * *